United States Patent Office 3,244,403
Patented Apr. 5, 1966

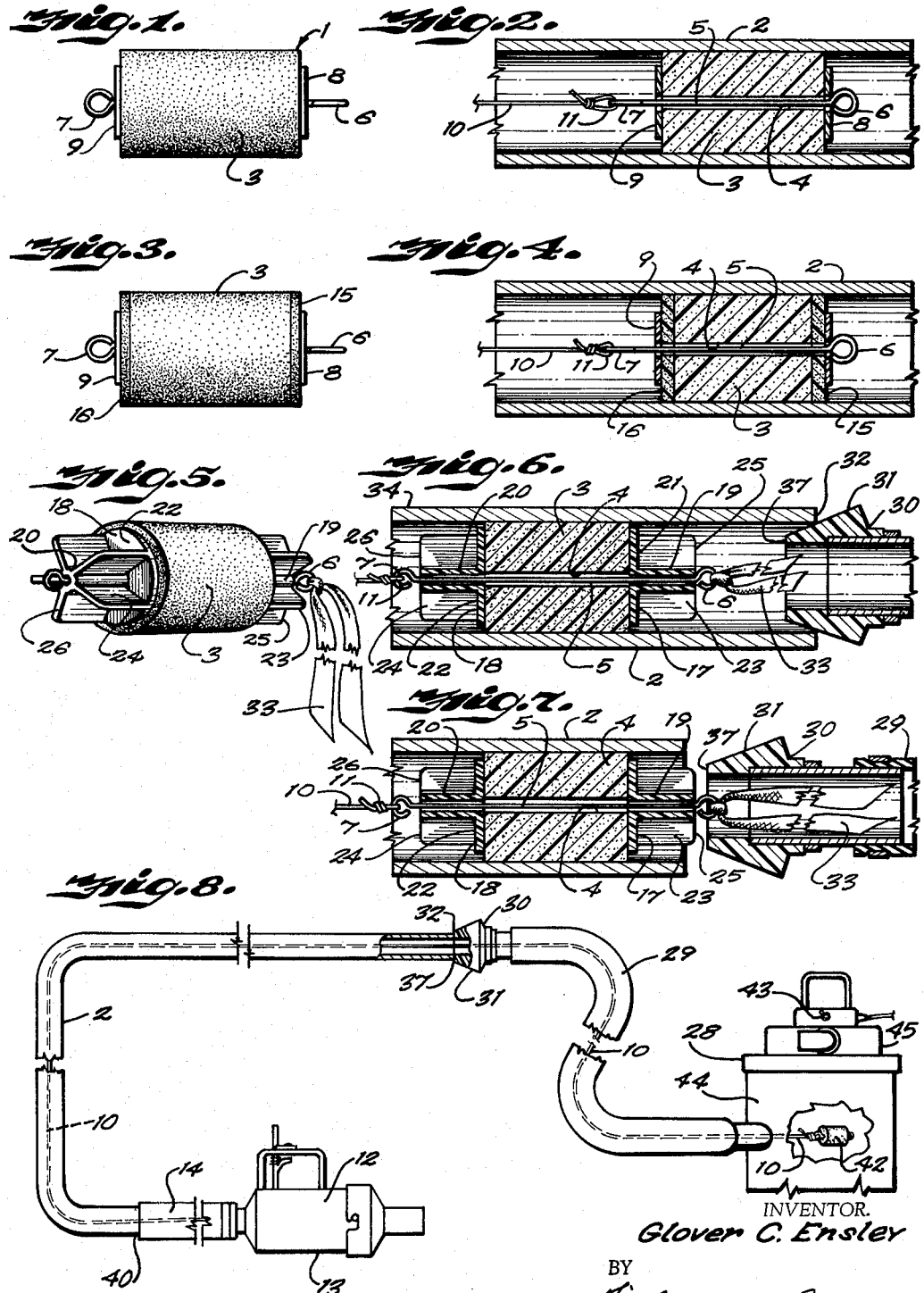

3,244,403
PISTON FOR THREADING LINES THROUGH A CONDUIT
Glover C. Ensley, 525 N. Woodland Drive, Kansas City North, Mo.
Filed June 8, 1964, Ser. No. 373,496
6 Claims. (Cl. 254—134.4)

This invention relates to a method and apparatus for forming a piston for threading a line through a conduit utilizing a portable blower or the like having a continuous output flow of air, and more particularly to a piston to which the line is attached and the piston being carried through the conduit by the flow of air from a source of supply.

The invention is also adaptable for use by drawing the piston through the condiut by a vacuum from a source of supply at the opposite end of the conduit from which the piston is threaded.

The piston of the present invention is an improvement over the line carrier shown in my co-pending application, Serial No. 338,963, filed January 20, 1964.

The principal object of the present invention is to provide a method and apparatus for forming a piston for threading a line through a conduit having a various turns or bends therein by attaching to the end of a line the piston of a polyfoam material or a material of the type which will prevent air from flowing therethrough from one end to the other, or axially therethrough so that the piston will be propelled through the condiut by air furnished from a portable source, such as a vacuum cleaner device and having a portable line package having a tube for connection to the end of the conduit through which the piston is to be blown whereby the release of the line from the line package will permit the air flow to carry the piston and line attached thereto through the conduit.

Other objects of the present invention are to provide a piston comprising a cylindrical body of a material which air will not penetrate through; to provide the body of the piston with a longitudinal opening therethrough for receiving a rod having its end extending outwardly from the end of the piston and turned to form eyes on each end for securing the line to be carried through the conduit; to provide washers on the end of the piston adjacent the eye on the rod; to provide yieldable end washers for the piston between the first washer and the ends of the body portion of the piston.

Still further objects of the present invention are to provide the piston with end guide members comprising a cylindrical hollow sleeve through which the rod extends and having a cylindrical end bearing against the respective ends of the piston body or yieldable polyfoam material; to provide the end members with spaced fins extending radially outwardly from the sleeve member, and to provide a device of this character simple and economical to manufacture.

I have also found that my device may be used with a vacuum providing a source of air suction from the source of supply whereby the piston may be inserted in one end of a conduit as described in my pending application Serial No. 338,963 and the suction hose or nozzle placed at the opposite end of the conduit and suction of the vacuum will draw the piston through the conduit; to provide a nozzle when used as a vacuum for entering the end of the conduit opposite to that which the piston is started and whereby when the fins on the piston reach said nozzle movement of the nozzle outwardly will break the vacuum; to provide a flexible ribbon or the like on the eye portion of the leading end of the piston whereby when the vacuum is broken the ribbon may be grasped by the hand of the user and the piston and line pulled through the conduit.

Other objects of this invention are to provide a method and apparatus for threading a conduit wherein standard readily available portable sources of suction and accessories therefor are utilized and whereby low pressure suction actuated apparatus for drawing a line through a conduit is utilized as distinguished from a high pressure system; to provide a device of this character which may be utilized for either blowing the piston through the conduit or using a vacuum for drawing the piston therethrough. The present invention is provided for use with a conduit having open ends spaced from each other and use of the apparatus for threading a line through the conduit by portable source of air from a blowing action whereby the piston may be inserted in one end of the conduit by the user and the force of air carries the line through the conduit and out the other end and where only one person is required to operate the system. Another use is that a portable source of suction is provided with nozzle means in air sealing engagement at one end of the conduit and the carrier is inserted in the other end of the conduit by a second person with the line secured to the piston and the portable sources of suction utilized to draw the piston and the line through the conduit.

Other objects and advantages of this invention will become apparent from the following description taken in connection with the accompanying drawings wherein are set forth by way of illustration and example certain embodiments of this invention.

FIG. 1 is a side elevational view of my polyfoam piston.

FIG. 2 is a longitudinal cross sectional view of the piston shown in a conduit.

FIG. 3 is a side elevational view of a form of piston having flexible end disks thereon.

FIG. 4 is longitudinal cross section of the piston illustrated in FIG. 3, shown in a conduit.

FIG. 5 is a perspective view of a modified form of a piston showing finned guide members for holding the piston in axial alignment as it moves through the conduit.

FIG. 6 is longitudinal cross sectional view of the type of piston shown in FIG. 5 with a nozzle for use of the apparatus as a vacuum.

FIG. 7 is a longitudinal cross sectional view of the piston shown in FIG. 6 after the vacuum has been broken by movement of the nozzle from the conduit.

FIG. 8 is a diagrammatic view of a small size piston which when used as a vacuum will move through the nozzle and hose to the source of supply of air for the vacuum.

Referring more in detail to the drawings.

1 designates a piston embodying the features of my invention adapted to be threaded through a conduit 2. The conduit may be above ground or underground and the term "conduit" includes ducts or pipes of various sizes. The piston includes a cylindrical body 3 of polyester foam or other yieldable material, but which will prevent air from passing therethrough from end to end or side to side. A longitudinal opening 4 is provided through the body 3 for receiving a rod 5 having its ends extending outwardly and turned in a loop to form eyes 6 and 7 as illustrated in FIG. 1. Plastic washers 8 and 9 are provided on the ends of the body 3 to prevent the eyes from embedding in the polyfoam material and damaging the same.

A line 10 is secured to one of the eyes 6 or 7 as indicated at 11 (FIG. 2). It will be obvious the line may be attached to either end of the piston. The invention contemplates use of a line package 12 enclosed within a housing 13 the line package and housing is disclosed and described in my copending application Serial No. 338,963 and will not be described in detail here. The housing 13 of the line package 12 has attached thereto a flexible tubular member 14 (FIG. 8) and also includes a flexible tubular member attached to a source of supply as also disclosed in my copending application Serial No. 338,963.

When it is desired to use a piston for carrying a line through a conduit as herein disclosed the operation is the same as that shown and described in said copending application Serial No. 338,963 by attaching the line 10 to the eye of the piston and the piston inserted in one end of the conduit. The line package is manipulated by the user and the source of air flow controlled to push the piston through the line as illustrated in FIG. 2.

The piston shown in FIGS. 3 and 4 is similar to that shown in FIGS. 1 and 2 and the operation is the same except that the body 3 includes end members 15 and 16 of substantially the same diameter as the body 3 made of neoprene sponge rubber or the like and which ends or disks will aid in cleaning of the inside of the conduits of debris and other material as the carrier passes therethrough, as well as aiding in keeping the piston in longitudinal relationship with the conduit.

In FIGS. 5 and 6 there is illustrated a modified form of piston wherein the rod 5 is elongated and extends outwardly from the body 3 and is provided with end guide members 17 and 18 comprising cylindrical sleeve members 19 and 20 to which is integrally formed cylindrical disks or end members 21 and 22 and extending radially outwardly from the cylindrical sleeve members 19 and 20 are a plurality of spaced fins 23 and 24 having their inner ends formed integrally with the disks 21 and 22 and having outer edges 25 and 26 extending in opposite directions.

The operation of the apparatus with the form of piston is the same as that previously described i.e. the line 10 is secured to one of the eyes 6 or 7 and the piston inserted in one end of the conduit and air supplied from a source of supply and by the manipulation of the line package as heretofore described the piston is propelled through the conduit and out through the other end.

When the piston is to be drawn through the conduit by a vacuum, a source of air is used from a vacuum cleaner or the like indicated at 28 (FIG. 8) having the flexible tube 29 attached thereto and the free end provided with a nozzle 30 having a tapered wall 31 (FIG. 6) which extends into the end 32 of the conduit.

With this form of the invention I have provided a piece of resilient ribbon or the like 33 tied to the eye 6 of the piston which is inserted into the conduit ahead of the piston and the piston inserted in the opposite end 34 of the conduit by placing the tubular member 14 against such end. By manipulation of the line package as shown and described in my copending application Serial No. 338,963, the line will be payed therefrom as the piston is drawn through the conduit by the suction from the vacuum cleaner 27. The edges 25 of the fins 23 will be drawn by the vacuum against the end 37 of the nozzle and by withdrawing the nozzle slightly from the open end of the conduit 32, the vacuum will be broken and the contact of the end 37 of the nozzle against the edges 25 of the fins 23 will also be broken as illustrated in FIG. 7. By grasping of the ribbon 33 by the hand of the user the piston and line may be drawn from the conduit.

The piston shown and described in FIGS. 5, 6 and 7 is devised for use in conduits 1½ inch in diameter and up to 3 inches, 3½ inches or even greater. The body portion of polyester foam material is 2 inches long and the diameter or cross section varies with the diameter of the conduit in which it is to be used. The cross section is slightly greater than the inside diameter of the pipe or conduit so that the body portion will be compressed slightly to aid in cleaning the interior of the conduit and to also prevent flow of air passing the piston as it moves through the conduit. The over-all length of the 2 inch piston is 6 inches including the guide end members. The guide end members may be made of plastic or other suitable light weight material. I have found that #10 copper coated steel wire suitable for the rod and eye member of the piston.

With the form of piston shown in FIG. 3, the disk ends 15 and 16 are preferably made of industrial neoprene sponge rubber of substantially the same diameter as the diameter of the cross section of the body portion 3.

With the form of piston shown in FIG. 1 the washers 8 and 9 may be made of plastic or other suitable light weight material.

The form of piston shown in FIGS. 1 and 3 may be used when the apparatus is used as either a vacuum to perform the method of drawing the piston through the conduit or may be blown through. As an example, as to the size of the pistons, a ½ inch inside diameter conduit takes a piston of 17/32 inch cross section.

In using the small type pistons with a vacuum the piston 42 with the line 10 attached thereto is placed in the end 40 of the conduit 2. One end of the flexible tube 14 attached to the housing 13 of the line package 12 is placed against the end 40 of the conduit 2. The end 37 of the nozzle 30 on the tube 29 is placed against the end 32 of the conduit 2 as illustrated in FIG. 8. The vacuum cleaner device 28 is then energized by the switch 43, to create a vacuum to pull the piston 42 through the conduit 2. As it passes from the end 32 of the conduit it will pass on through the nozzle 31 and through the tube 29 and into the housing 44 of the vacuum device 28, also as illstrated in FIG. 8, where it may be removed by removing the cover member 45 and the line disengaged therefrom so the piston may be reused. Pistons up to 1½ inches in diameter or cross section may be used in this manner.

It will be obvious from the foregoing that I have provided an improved method of making a piston for use in connection with apparatus for threading line through conduit and the like wherein the piston will clean the inside of the conduit and may be there blown through the conduit by a one man operation or may be drawn through the conduit by vacuum using two men for operation of the apparatus.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A piston for threading a line axially through a conduit having open ends by a flow of fluid against one end of said piston, said piston having a body portion of non-porous resilient material to bar said fluid from passing axially through said body and having a cross section to fit snugly in said conduit, said body portion having an opening longitudinally through the center thereof, a rod engaging in said opening and having its ends extending outwardly of the ends of the body portion, guide members on said rod for maintaining the axis of said piston parallel to the axis of said conduit, said guide members including sleeve portions through which the ends of the rods extend, disk portions engaging against the ends of the body portion and spaced fins extending radially outwardly of said sleeve portions, means on the ends of said rod for attaching one end of the line to said piston whereby said fluid flowing against an end of said piston will carry said piston through said conduit with the line attached thereto.

2. The combination of claim 1 wherein said means for attaching the line to said piston consists of an eye on each end of said rod.

3. The apparatus of claim 2 wherein said body portion consists of polyester foam material and the cross section of said body is greater than the diameter of said conduit.

4. For use with a conduit having a pair of open ends, apparatus for threading a line through the conduit comprising,
(a) a vacuum cleaner at one end of the conduit,
(b) nozzle means in relative air-sealing engagement between the said end of the conduit and said vacuum cleaner,
(c) a piston inserted at the other end of the conduit having a closed cell body portion for preventing air passing therethrough and a rod extending axially through said body having eyes on its respective ends and guide members on said rod at each end of said body portion, said guide members having spaced fins extending outwardly from the ends of the body portion,
(d) a line secured to an eye on said rod, whereby said vacuum cleaner may be actuated to draw said piston through said conduit, the fins on said guide members being drawn against said nozzle means and said vacuum being broken immediately said nozzle is disengaged from said conduit.

5. The combination of claim 4 including means secured to the other eye on said rod for withdrawing said piston and line from said conduit.

6. For use with a conduit having a pair of open ends, apparatus for threading a line through the conduit comprising,
(a) a vacuum source at one end of the conduit,
(b) nozzle means in relative air-sealing engagement between the said end of the conduit and said vacuum source and having a portion presented to the conduit interior at the end thereof,
(c) a piston inserted at the other end of the conduit having a closed cell body portion for preventing air passing therethrough and a rod extending axially through said body with ends outwardly thereof and guide members on said rod at each end of said body portion, said guide members having spaced portions extending outwardly from the respective end of the body portion to provide an interrupted forward surface,
(d) a line secured to a rod end whereby said vacuum source may be attached to draw said piston through said conduit, the extending portions on the guide member at the leading end of the body being drawn to the nozzle for contact of said interrupted surface with said presented portion of said nozzle means at spaced points and said vacuum to the conduit and body being broken immediately said nozzle is disengaged from said conduit.

References Cited by the Examiner

UNITED STATES PATENTS 3,119,600  1/1964  Bitter _____ 254—134.4

EDWARD C. ALLEN, *Primary Examiner.*

OTHELL M. SIMPSON, *Examiner.*